Oct. 12, 1948.  C. E. WHITE  2,451,137
CONTOUR GRINDING MACHINE FOR WORK PIECES EACH
HAVING A HOLLOW SPHERICAL SECTION
Filed Oct. 9, 1947  2 Sheets-Sheet 1
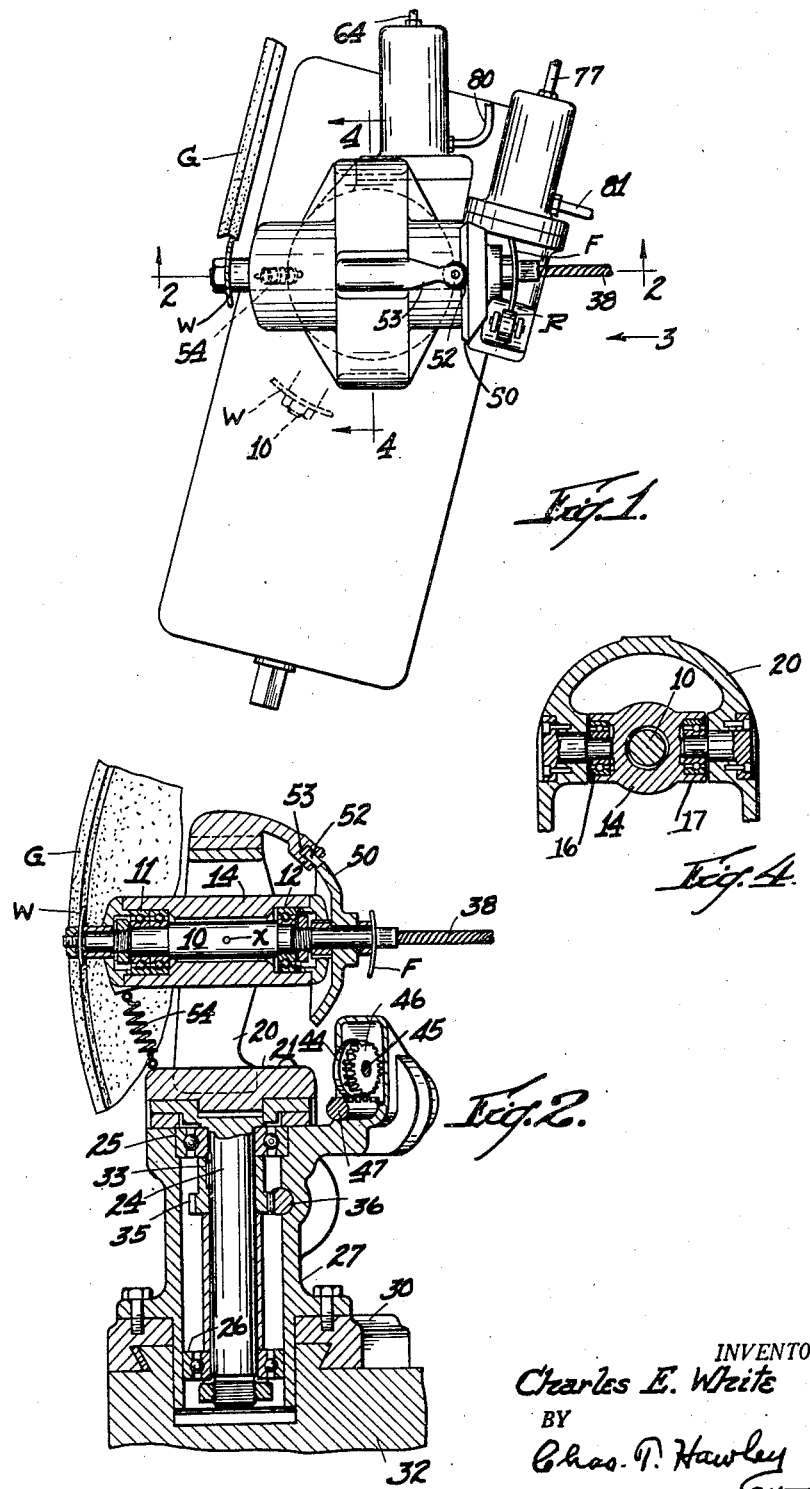
INVENTOR.
Charles E. White
BY
Chas. T. Hawley
Attorney

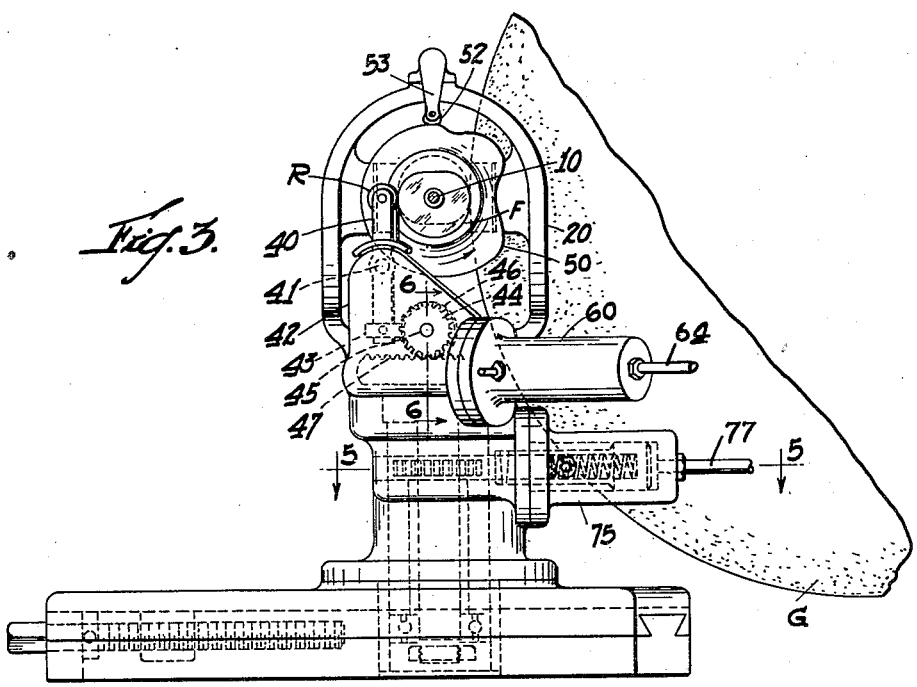
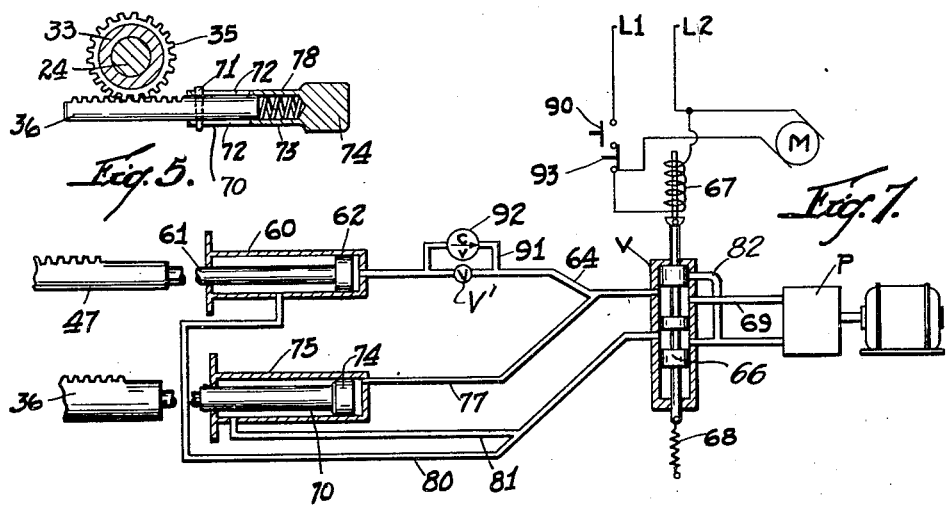
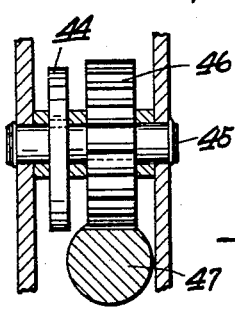

Patented Oct. 12, 1948

2,451,137

UNITED STATES PATENT OFFICE 2,451,137

CONTOUR GRINDING MACHINE FOR WORK PIECES EACH HAVING A HOLLOW SPHERICAL SECTION

Charles E. White, Ashburnham, Mass., assignor, by mesne assignments, to Van Norman Company, Springfield, Mass., a corporation of Massachusetts Application October 9, 1947, Serial No. 778,934

9 Claims. (Cl. 51—101)

This invention relates to a machine for grinding contours on work pieces having spherical surface areas, such as pattern plates or forms used in manufacturing spectacle lenses.

It is the general object of the invention to provide a grinding machine in which a master form having a hollow spherical section may be quickly and accurately duplicated in a continuous grinding operation.

In the carrying out of my invention, I provide an improved work holder by which the work piece is maintained in such relation to the wheel that the rate of stock removal is substantially constant when the work is rotated at constant speed and regardless of changes in contour or in the effective radius of the work piece.

The invention further relates to arrangements and combinations of parts which will be hereinafter described and more particularly pointed out in the appended claims.

A preferred form of the invention is shown in the drawings, in which

Fig. 1 is a plan view of my improved grinding machine;

Fig. 2 is a sectional front elevation, taken substantially along the line 2—2 in Fig. 1;

Fig. 3 is a side elevation, looking substantially in the direction of the arrow 3 in Fig. 1;

Fig. 4 is a detail sectional elevation, taken along the line 4—4 in Fig. 1;

Fig. 5 is a detail sectional plan view, taken along the line 5—5 in Fig. 3;

Fig 6 is a detail sectional elevation, taken along the line 6—6 in Fig. 3; and

Fig. 7 is a diagrammatic view of certain control mechanism.

Referring to the drawings, my improved grinding machine comprises a wheel G mounted to rotate about a fixed axis in the usual manner and preferably having an angularly disposed cutting surface, as indicated in Fig 1.

The work piece W is of hollow spherical section and is fixed on work spindle 10 (Fig. 2) rotatable in bearings 11 and 12 in a bearing block 14. The block 14 is mounted in horizontal bearings 16 and 17 (Fig. 4) in a frame 20 having a base portion 21 (Fig. 2) secured to the upper end of an upright spindle 24. The spindle 24 is rotatable in upper and lower bearings 25 and 26 in a frame member 27 mounted on a table 30 which is slidable in guideways on a fixed base 32.

The axis of the work spindle 10 and the axis of the upright shaft 24 and the axis of the bearings 16 and 17 all intesect at a point $x$ (Fig. 2) which is also the center of surface curvature of the work piece W.

A sleeve 33 (Fig. 2) is keyed to the spindle 24 and is provided with gear teeth forming a pinion 35 engaged by rack teeth formed on one side of a rack bar 36. Means for operating the rack bar 36 will be hereinafter described.

A master form F of the same surface curvature is also mounted on the work spindle 10 and is a left-hand or mirror reproduction of the desired work piece and preferably at the same radial distance from the point $x$. The spindle 10 is continuously rotated through a flexible driving cable 38 by a motor M (Fig. 7).

The master form F coacts with a reference roll R (Fig. 3) which is pivotally mounted at the upper end of a lever 40 which is pivoted at 41 on a flange 42 formed integral with or secured to the frame 20.

At its lower end, the lever 40 has a cross rod or plunger 43 adjustable therein and engaging an eccentric 44 (Fig. 6) secured on a shaft 45 which also supports a gear 46. A rack bar 47 (Fig. 3) engages the gear 46 and is shifted axially by operating means to be described.

A disc-like spherical cam 50 (Figs. 2 and 3) is mounted on the work spindle 10 and rotates with the form F and the work piece W. The cam 50 is engaged by a reference roll 52 (Fig. 2) pivotally mounted on an arm 53 fixed to and projecting laterally from the upper part of the frame 20 in which the bearing block 14 is pivoted to swing. A spring 54 yieldingly holds the cam 50 against the reference roll 52.

The work piece W thus has universal adjustment about the point $x$ which is its center of curvature.

The rack bar 47 extends to a cylinder 60 (Fig. 7) where it is connected by a rod 61 to a piston 62. The cylinder 60 is connected by a pipe 64 to a piston valve V having a three-part piston or plunger 66 moved in one direction by a solenoid coil 67 and moved by a spring 68 in the other direction. Oil is supplied to the valve V through a pipe 69 from a pump P operated by a motor M'.

The rack bar 36 (Fig. 5) is slidable in an axial recess in a piston rod 70 and is provided with a cross-pin 71 slidable in slots 72 in the slides of said piston rod. The inner end of the piston rod 70 is connected to a piston 74 slidable in a cylinder 75. A spring 76 behind the piston rod 70 yieldingly permits the rack bar 36 to stop when the master form F engages the reference roll R.

The cylinder 75 has a feed pipe 77 connected to the pipe 64, and the cylinders 60 and 75 have return pipes 80 and 81 joined together and also controlled by the valve V which has an exhaust connection 82 to the pump P. The pipe 64 has an adjustable needle V' and a by-pass 91 with a check valve 92.

The control structure shown in Fig. 7 is to be taken as illustrative only. Power is supplied through line wires L1 and L2 for the motor M and solenoid coil 67.

Having described the details of construction of my improved machine, the method of operation thereof is as follows:

When the piston 74 in the cylinder 75 is in the inner position shown in Fig. 7, the rack bar 36 is withdrawn and the work is positioned remote from the wheel, as shown in dotted lines in Fig. 1.

A finished work piece may then be removed and a fresh blank may be placed on the spindle 10. The machine is then started by pushing a starting button 90 (Fig. 7) which immediately starts the motor M to rotate the work spindle 10 through the flexible cable 38.

At the same time, the solenoid coil 67 is energized, raising the plunger 66 in the valve V to the position shown in Fig. 7, thus connecting the pump P to supply oil under pressure to the pipes 64 and 77, and connecting the pipes 80 and 81 to exhaust.

The piston 74 immediately acts through the rack bar 36 and pinion 35 (Fig. 2) to rotate the shaft 24 and frame 20 and thus swing the form F against the reference roll R, at the same time advancing the work W for engagement by the grinding wheel G. When the form F engages the reference roll R, the spring 73 (Fig. 5) yields to permit further advance movement of the piston 74 and holds the form firmly against the roll.

At the same time, the oil admitted to the cylinder 60 through the pipe 64 and needle valve V' slowly advances the piston 62 and rack bar 47, which in turn slowly rotates the pinion 46 and eccentric 44 (Fig. 6).

The eccentric 44 is only very slightly off center, so that this slow rotation of the eccentric produces an extremely slow advance movement of the reference roll R, the total movement being just sufficient to provide the desired feed of the work piece W toward the wheel G during the grinding operation.

When the eccentric presents its point of greatest effective radius to the end of the plunger 43, the roll R assumes its final inward position and thus determines the finished size of the work piece. This size may be varied by adjusting the plunger 43.

As the master form F and work piece W rotate with the spindle 10, the spherical cam 50 is similarly rotated against the reference roll 52. The function of this cam is to raise or lower the work piece with reference to the grinding wheel as the circumferential curvature or contour of the master form changes. This prevents overhang of the work piece at a point of increasing diameter and also serves to maintain the cut substantially uniform, regardless of changes in contour. The cam 50 also maintains contact between the work W and the wheel G at a single point in the periphery of the wheel.

It will be noted that the work piece is secured to the spindle 10 in a reverse position or at 180° from the form F and that it is also reversed from left to right, as in a mirror. In other words, a left-hand form is required for grinding a right-hand work piece.

When the grinding operation is completed, a stop button 93 (Fig. 7) is pressed to break the circuit from the line wires L1 and L2 to the motor M and to the solenoid 67. The work spindle immediately stops and at the same time the piston 66 and valve V moves downward, connecting the pump to supply the pipes 80 and 81 and connecting the pipes 64 and 77 to exhaust.

The pistons 62 and 74 are then quickly returned to initial position, withdrawing the reference roll R to rough-grinding position and swinging the work piece away from the wheel G to reloading position. During this operation, the check valve 92 opens to permit the oil exhausted from the cylinder 60 to flow freely around the needle valve V'.

Having thus described my invention and the advantages thereof, I do not wish to be limited to the details herein disclosed, otherwise than as set forth in the claims, but what I do claim is:

1. A contour grinding machine for work pieces each having a hollow spherical section comprising a grinding wheel, a work spindle, means to mount a work piece on said spindle, a bearing member in which said spindle is rotatably mounted, means to rotate said spindle, a frame member in which said bearing member is mounted to swing about a horizontal axis perpendicular to the axis of said spindle, a support in which said frame member is mounted to swing about a vertical axis perpendicular to the axis of said spindle, pattern means effective to swing said spindle horizontally to move the work piece toward the grinding wheel, means to move the work piece away from the grinding wheel, and additional pattern means to shift said work piece vertically with respect to the grinding point.

2. A contour grinding machine as set forth in claim 1, in which a reference roll coacts with a master form on the work spindle to move the work in a horizontal plane, and in which means is provided to gradually advance said reference roll to shift the grinding locus during the grinding operation.

3. A contour grinding machine as set forth in claim 1, in which the axis of the work spindle, the axis of the bearing member and the axis of the support all pass through a common point which is also at the center of spherical curvature of the work piece.

4. A contour grinding machine for work pieces having a hollow spherical section comprising a grinding wheel, a work spindle, means to mount a work piece at one end of said spindle and a master form at the other end, a bearing member in which said spindle is rotatably mounted, means to rotate said spindle, a frame member in which said bearing member is mounted to swing about a horizontal axis perpendicular to the axis of said spindle, a support in which said frame member is mounted to swing about a vertical axis, means coacting with said master form to swing said spindle horizontally to move the work piece toward and away from the grinding wheel as said work piece is rotated, and additional pattern means to shift said work piece vertically with respect to the grinding point.

5. A contour grinding machine as set forth in claim 4, in which the coacting means includes a reference roll which is engaged by the master form and thereby shifts the work in a horizontal plane, and in which means is provided to gradually advance said reference roll to advance the grinding locus toward the grinding wheel during the grinding operation.

6. A contour grinding machine as set forth in claim 4, in which the additional pattern means includes a contoured cam mounted on and rotating with the work spindle, and in which a reference roll on said frame member coacts with said contoured cam to swing the work spindle in a vertical plane on substantial increase or decrease of effective work diameter at the grinding point.

7. A contour grinding machine as set forth in claim 4, in which the axis of the work spindle, the axis of the bearing member and the axis of the support all pass through a common point which is also at the center of spherical curvature of the work piece and of the master form.

8. A contour grinding machine for work pieces having a hollow spherical section comprising a grinding wheel, a work spindle, means to mount a work piece at one end of said spindle and a master form at the other end, a bearing member in which said spindle is rotatably mounted, means to rotate said spindle, means coacting with said master form to swing the work piece toward and away from the grinding wheel about a vertical axis, and pattern means to swing the work piece relative to the point of grinding contact about a horizontal axis intersecting said vertical axis.

9. The combination in a grinding machine as set forth in claim 8, in which the intersection of the vertical and horizontal axes is substantially at the center of curvature of the spherical work pieces areas.

CHARLES E. WHITE.

No references cited.